United States Patent Office 3,261,789
Patented July 19, 1966

3,261,789
CURING HALOGENATED POLYMERS
Martin Berger, East Brunswick, Nicholas Michaels, Roselle, and Thomas A. Manuel, Westfield, N.J., assignors to Esso Research and Engineering Company, a corporation of Delaware
No Drawing. Filed Feb. 5, 1963, Ser. No. 256,263
7 Claims. (Cl. 260—5)

This invention relates to rubbery polymeric compositions which contain halogenated copolymers of isoolefins and multiolefins, to the preparation and vulcanization of such compositions, and especially to improved methods for curing halogenated butyl rubber.

Copolymers of the above general type, especially where the copolymer contains about 85 to 99.5% (preferably about 95 to 99.5%) of a $C_4$ to $C_7$ isoolefin such as 2-methyl-1-butene, 3-methyl-1-butene or especially isobutylene with about 15 to 0.5% (preferably 5 to 0.5 weight percent) of a multiolefin of about 4 to 14, preferably about 4 to 6, carbon atoms and having a Staudinger molecular weight of between about 20,000 and 300,000 are commonly referred to in patents and in literature as "butyl rubber" or GR–I (Government rubber-isobutylene) and, for example, is referred to as "butyl rubber" in textbook "Synthetic Rubber" by G. S. Whitby. The preparation of butyl type rubber is also described in U.S. Patent No. 2,356,128 to Thomas et al. In general, the multiolefinic component of the rubber comprises such multiolefins as myrcene, allo-ocimene, dimethallyl or preferably a conjugated diolefin such as isoprene, butadiene, dimethyl butadiene, piperylene, etc. The reaction product preferably has a mole percent unsaturation of between about 0.5 to 10.0.

Halogenated butyl-type rubbery copolymers, which are vulcanizable with zinc oxide alone and completely covulcanizable with more highly unsaturated rubbers into desirable materials of high tensile strength, are produced by halogenating the butyl rubber in a manner which does not appreciably degrade the molecular weight thereof, but with sufficient halogen to produce a rubbery product which, when vulcanized by sulfur, retains its tensile strength upon heat aging. Such halogenated butyl rubbers are covulcanizable with more highly unsaturated rubbers, for example by means of added sulfur, to produce rubbery products having somewhat improved heat aging resistance since halogenated butyl rubbers do not greatly differ in curing rate as compared to natural rubber and synthetic rubbers such as GR–S rubber. The sulfur cures may optionally also be in the presence of basic metal oxides such as zinc oxide and accelerators.

It has now been discovered that halogenated butyl rubber may be vulcanized at an accelerated rate and its compatibility with more highly unsaturated rubbers increased by pretreating the halogenated butyl rubber with iron carbonyl and then vulcanizing it in conventional manner with curatives such as sulfur, accelerators such as thiuram sulfides, thiocarbamates, mercaptobenzothiazole, thiazyl sulfides or the like, organic polyamines and/or quinoid compounds such as paraquinone dioxime, etc.

In practicing the invention the halogenated butyl rubber is dissolved in a hydrocarbon solvent, e.g., hexane or heptane, and then heated with 1 to 30 parts by weight of iron pentacarbonyl for several hours at 75–90° C. The resulting modified halogenated butyl rubber is precipitated and compounded in accordance with conventional recipes alone or in admixture with 20 to 80 parts by weight of highly unsaturated rubbers such as SBR, ABR, natural rubber, etc.

SBR, also known as GR–S, is a copolymer of three parts of butadiene with one part of styrene. Butadiene and styrene are suspended in finely divided emulsion form in a large proportion of water in the presence of a soap or detergent, together with an inhibitor or catalyst, usually peroxide, and a chain modifying agent, usually a mercaptan such as dodecyl mercaptan.

ABR is the rubbery polymer obtained by polymerizing a butadiene hydrocarbon having the general formula

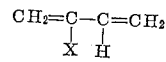

wherein X is hydrogen or alkyl with a compound having the general formula

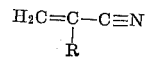

wherein R is hydrogen or alkyl. The butadiene hydrocarbon should be 50 to 85% of the total weight of the reactants. One method of preparation is as follows: The mixture of the reactants, may be emulsified with water in the presence of an emulsifying agent, as a soap. The emulsion is polymerized by means of a peroxide catalyst with shaking or stirring at a temperature between about 30° to 100° C. The polymerized products are in the form of a latex-like emulsion which can be coagulated by freezing out or by adding a suitable acid and/or alkali metal salt. The preferred polymer is prepared by reacting 75 to 45% butadiene and 25 to 55% acrylonitrile. The preparation of this copolymer is described in U.S. Patent No. 1,973,000 which is incorporated herein by reference.

A combination paraquinone dioxime and lead oxide is capable of vulcanizing the polymer. The chemical reactions involved in the vulcanization of the polymer by quinone dioxime in the presence of an oxidizing agent appear to consist in the formation of aromatic nitroso groups which in turn react with the isoprene units in the polymer chain. Some sulfur is necessary to produce faster and more tightly vulcanized compounds. Paraquinone dioxime concentrations are from 1 to 8 and the lead oxide concentrations from 5 to 20 parts. The ratio of 6 paraquinone dioxime and 10 lead oxide is the most efficient combination. The sulfur concentration ranges between 0.5 to 4 parts, with 2 parts being preferred.

Benzothiazyl disulfide acts as a mild oxidizing agent for paraquinone dioxime by virtue of the cleavage of the disulfide to form two mercaptan molecules. Apparently the conversion of the dioxime to the nitroso group, brought about by the loss of a hydrogen atom, results in the same type of vulcanization mechanism as for the paraquinone dioxime cure. The reaction in this case, however, it not as rapid as for the paraquinone dioxime lead oxide blend. The following limits apply for this particular cure: Benzothiazyl disulfide 1.0 to 6.0, preferably 4; paraquinone dioxime 1.0 to 8.0, preferably 2; sulfur .5 to 4.0, preferably 2. Vulcanizates thus obtained have excellent modulus and tensiles.

In producing halogenated butyl rubber to be vulcanized in accordance with the present invention, unmodified, unvulcanized butyl rubber is carefully halogenated so as to contain about at least 0.5 weight percent (preferably at least about 1.0 weight percent) combined halogen but not more than about "X" weight percent combined fluorine or chlorine or 3 "X" weight percent combined bromine or iodine wherein:

$$X = \frac{M_3 L}{(100-L)M_1 + L(M_2+M_3)} \times 100$$

and:

$L$=mole percent of the multiolefin in the polymer
$M_1$=molecular weight of the isoolefin
$M_2$=molecular weight of the multiolefin
$M_3$=atomic weight of halogen Restated, there should be at least about 0.5 weight percent of combined halogen in the polymer but not more than about one atom of fluorine or chlorine or three atoms of bromine or iodine combined in the polymer per molecule of multiolefin present therein; i.e., not more than about one atom of combined fluorine or chlorine or three atoms of combined bromine or iodine per double bond in the polymer.

Suitable halogenating agents which may be employed are gaseous chlorine, liquid bromine, hydrogen fluoride, iodine monochloride, alkali metal hypochlorites, sodium hypobromite, $C_4$ to $C_{10}$ tertiary alkyl hypochlorites or hypobromites, sulfur chlorides or bromides (particularly oxygenated sulfur chlorides or bromides), N-bromo-succinimide, N-chloroacetanilide, tribromophenol bromide, N - chloroacetamide, N,N' - dimethyl - 5,5 - dichloro or dibromo-hydantoin and other common halogenating agents.

The halogenation is generally conducted at about 0° to about +200° C., advantageously at about 10° to 65° C., preferably at about 20° to 50° C. (room temperature generally being satisfactory), depending upon the particular halogenation agent, for about one minute to several hours. An advantageous pressure range is from about 0.5 to 400 p.s.i.a.; atmospheric pressure being satisfactory.

The halogenation conditions are regulated to halogenate the rubbery copolymer to the extent above-mentioned.

The halogenation may be accomplished in various ways. One process comprises preparing a solution of the copolymer as above, in a suitable inert liquid organic solvent such as a $C_3$ to $C_{10}$ or preferably a $C_5$ to $C_8$ inert hydrocarbon or halogenated derivatives of saturated hydrocarbons, examples of which are hexane, heptane, naphtha, mineral spirits, cyclohexane, alkyl substituted cycloparaffins, benzene, chlorobenzene, chloroform, trichloroethane, carbon tetrachloride, mixtures thereof, etc., and adding thereto gaseous chlorine, liquid bromine, or other halogenating agent, which may optionally be in solution, such as dissolved in any inert hydrocarbon, an alkyl chloride, carbon tetrachloride, etc.

The concentration of the butyl rubber in the solvent will depend upon the type of reactor, molecular weight of the butyl rubber, etc. In general, the concentration of a butyl rubber having a viscosity average molecular weight of about 200,000 to about 1,500,000, if the solvent is a substantially inert hydrocarbon, will be between 1 and 30% by weight, preferably about 5 to 20%. If chlorine or hydrogen fluoride are employed to halogenate such a rubbery solution, they may also be diluted with up to about 50 times their volume, preferably about 0.1 to 5.0 times their volume of an inert gas such as nitrogen, methane, ethane, carbon dioxide, etc.

The resulting halogenated butyl rubber polymer may be recovered in various manners. The halogenated polymer may be precipitated with acetone or any other known nonsolvent for the halogenated butyl rubber and dried under about 1 to 760 millimeters or higher of mercury pressure absolute at about 0° to 180° C. preferably at about 50° to 150° C. (e.g., 70° C.). Other methods of recovering the halogenated butyl rubber polymer from the hydrocarbon solution of the same are by conventional spray or drum drying techniques. Alternatively, the halogenated butyl rubber-containing solution may be injected into a vessel containing agitated water heated to a temperature sufficient to flash off the hydrocarbon solvent and form an aqueous slurry of the halogenated butyl rubber. The halogenated butyl rubber may then be separated from this slurry by filtration, dried and recovered as a "crumb" or as a dense sheet or slab by conventional milling and/or extruding procedures. The halogenated copolymer formed advantageously has a viscosity average molecular weight between about 200,000 and 2,500,000 and a mole percent unsaturation of between about 0.5 to 15.0, preferably about 0.6 to 5.0.

In order to more fully illustrate the invention, the following experimental data are given:

*Example*

28.6 grams of a brominated isobutylene-isoprene butyl rubber copolymer having a Mooney viscosity (212° F. for 8 minutes) of 66, a mole percent unsaturation of 0.71, a viscosity average molecular weight of 480,000, and containing 2.2 weight percent of combined bromine, were dissolved in 1200 cc. of heptane. To this a solution of 3.45 ml. of $Fe(CO)_5$ in 400 ml. of heptane was added (10.7 phr.). 0.04 gram of 2.6 ditertiary butyl cresol was also added. This solution was heated for two hours at 80° C., and the product was precipitated by a 1% HCl in acetone mixture. The modified bromo butyl rubber thus obtained was dried and compounded as follows:

| Sample | #1 | #2 | #3 | #4 | #5 | #6 |
|---|---|---|---|---|---|---|
| SBR | | | 80 | 80 | 20 | 20 |
| Bromo Butyl Rubber | 100 | | 20 | | 80 | |
| Modified Bromo Butyl Rubber | | 100 | | 20 | | 80 |
| Philblack O | 50 | 50 | 50 | 50 | 50 | 50 |
| ZnO | 5 | 5 | 5 | 5 | 5 | 5 |
| Tuads (tetramethylthiuramdisulfide) | 0.15 | 0.15 | 0.15 | 0.15 | 0.15 | 0.15 |
| Benzothiazyl disulfide | 1.5 | 1.5 | 1.5 | 1.5 | 1.5 | 1.5 |
| Spider sulfur | 2 | 2 | 2 | 2 | 2 | 2 |

Each sample was cured at 287° F.
The properties of the cured products were as follows:

| | 300% Modulus (#/in.²) Compound No. | | | | | |
|---|---|---|---|---|---|---|
| | 1 | 2 | 3 | 4 | 5 | 6 |
| Cure Time: | | | | | | |
| 10' | 857 | 1,778 | 471 | 632 | 1,589 | 2,183 |
| 20' | 1,600 | 2,056 | 1,167 | 1,778 | 2,298 | 2,798 |
| 40' | 2,138 | 2,412 | 2,288 | 2,500 | 2,772 | 3,168 |
| 80' | 2,522 | | 3,055 | | | |

| | Tensile (#/in.²) Compound No. | | | | | |
|---|---|---|---|---|---|---|
| | 1 | 2 | 3 | 4 | 5 | 6 |
| Cure Time: | | | | | | |
| 10' | 2,318 | 2,752 | 1,098 | 1,947 | 2,859 | 2,987 |
| 20' | 2,853 | 2,981 | 2,649 | 3,555 | 2,929 | 3,208 |
| 40' | 2,676 | 2,745 | 3,292 | 3,361 | 2,926 | 3,038 |
| 80' | 2,673 | 2,411 | 3,518 | 2,163 | 2,876 | 2,658 |

From the above results, it is obvious that the modified products cure much faster (i.e., reach a higher modulus at low cure time) and also reach optimum tensile at earlier cure times. This property is also dramatically demonstrated in blends with SBR as shown in colums 3, 4, 5, and 6.

The nature of the present invention having been thus fully set forth and specific examples of the same given what is claimed as new and useful and desired to be secured by Letters Patent is:

1. A composition comprising the reaction product of a major proportion of a rubbery halogenated copolymer of about 85 to 99.5 weight percent of a $C_4$ to $C_7$ isoolefin and about 15 to 0.5 weight percent of a $C_4$ to $C_{14}$ multiolefin and a minor proportion of iron pentacarbonyl.

2. A composition according to claim 1 in which the halogenated copolymer contains at least about 0.5 weight percent bromine but not more than about three combined atoms of bromine per double bond in the copolymer and said copolymer is in composition with a minor proportion of a curative selected from the group consisting of sulfur, zinc oxide, thiuram sulfides, thiocarbamates, mercaptobenzothiazole, thiazyl sulfides, and mixtures thereof.

3. A composition according to claim 1 in which the iron pentacarbonyl is present in an amount of between about 1 and 30 weight percent based on halogenated copolymer.

4. A composition comprising 100 parts by weight of a rubbery polymer having a viscosity average molecular weight of at least about 100,000 comprising atoms of hydrogen, carbon and a halogen selected from the group consisting of bromine and chlorine, containing in its structure a major proportion of hydrocarbon units derived by the polymerization of isoolefins containing about 4 to 7 carbon atoms and also containing sufficient units in which a pair of carbon atoms is linked by an olefinic double bond that the mole percent unsaturation is between about 0.5 and 15; said polymer containing at least about 0.5 weight percent halogen but not more than about three combined atoms of halogen per double bond in the polymer; said polymer being in composition with about 1 to 30 parts by weight of iron pentacarbonyl.

5. A composition according to claim 4 in which the polymer contains bromine in an amount of not more than 2 atoms per double bond.

6. A method for improving the vulcanizing characteristics of halogenated butyl rubber which is a rubbery halogenated copolymer of about 85 to 99.5 weight percent of a $C_4$ to $C_7$ isoolefin and about 15 to 0.5 weight percent of a $C_4$ to $C_{14}$ multiolefin which comprises heating at 75 to 90° C. a hydrocarbon solution of said butyl rubber with 10.7 parts by weight of iron pentacarbonyl per 100 parts of butyl rubber and precipitating the resulting adduct.

7. A vulcanized composition comprising 20 to 80 parts by weight of an unsaturated rubber chosen from the group consisting of natural rubber, a copolymer of three parts of butadiene with one part of styrene and a rubbery copolymer of 75 to 45% butadiene, and 25 to 55% acrylonitrile and 80 to 20 parts by weight of the reaction product of a rubbery halogenated copolymer of about 85 to 99.5 weight percent of a $C_4$ to $C_7$ isoolefin and about 15 to 0.5 weight percent of a $C_4$ to $C_{14}$ multiolefin and iron pentacarbonyl.

No references cited.

MURRAY TILLMAN, *Primary Examiner.*
SAMUEL H. BLECH, *Examiner.*
D. J. BREZNER, *Assistant Examiner.*